H. SMITH.
CONVERTIBLE VEHICLE BODY.
APPLICATION FILED SEPT. 15, 1913.

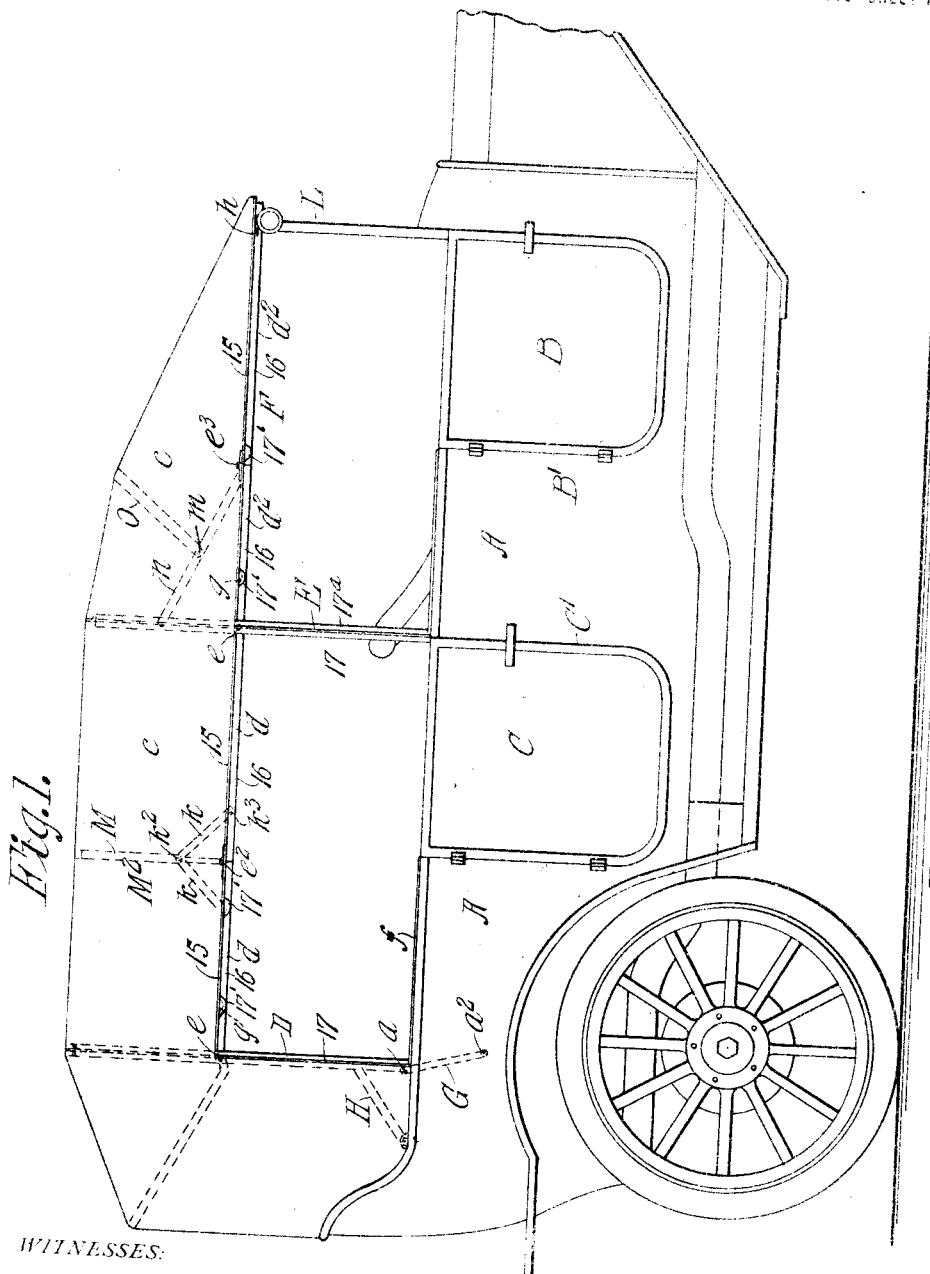

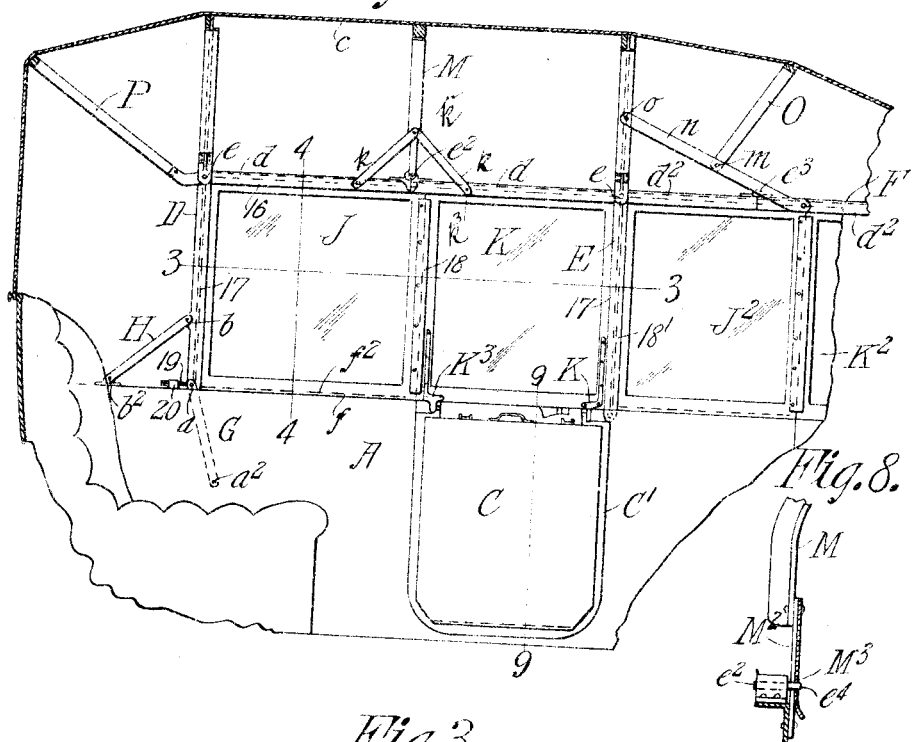

1,181,689.

Patented May 2, 1916.
3 SHEETS—SHEET 3.

WITNESSES

INVENTOR,
Hinsdale Smith,
BY
ATTORNEY.

UNITED STATES PATENT OFFICE.

HINSDALE SMITH, OF SPRINGFIELD. MASSACHUSETTS, ASSIGNOR, BY MESNE ASSIGNMENTS, TO SPRINGFIELD BODY CORPORATION OF NEW YORK, OF NEW YORK, N. Y., A CORPORATION OF NEW YORK.

CONVERTIBLE VEHICLE-BODY.

1,181,689.      Specification of Letters Patent.      Patented May 2, 1916.

Application filed September 15, 1913. Serial No. 789,738.

*To all whom it may concern:*

Be it known that I, HINSDALE SMITH, a citizen of the United States of America, and resident of Springfield, in the county of Hampden and State of Massachusetts, have invented certain new and useful Improvements in Convertible Vehicle-Bodies, of which the following is a full, clear, and exact description.

This invention relates to bodies for automobiles and other vehicles and more especially to constructions and arrangements included in the top and in the body and appurtenances of the latter whereby the vehicle may be used with the top up and with the interior entirely inclosed as completely as is the case in a limousine, or whereby the vehicle may be employed with the overhead or canopy portion up but with the sides open, or whereby the top may be compactly folded and carried in a lowered position at the rear of the body.

The particular objects of the invention are more definitely indicated and the means for their attainment shown in the accompanying drawings hereinafter described in conjunction therewith and set forth in the claims.

Figure 9:
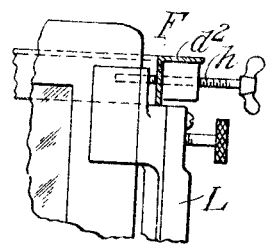
Figure 10:
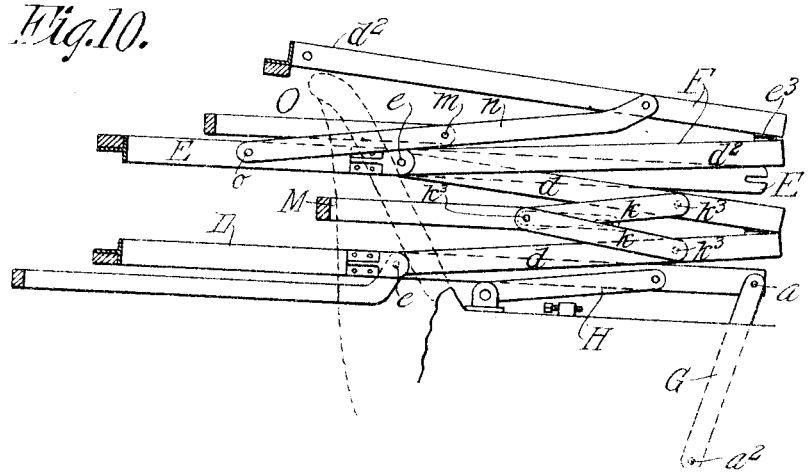

In the drawings, Figure 1 is a side elevation of the body of an automobile showing the top up but the side closures or window sections removed. Fig. 2 is a central sectional elevation longitudinally through the body with the parts in the same relations as represented in Fig. 1, but with the window sections shown in their places for closing the side of the vehicle. Fig. 3 is a partial horizontal sectional view on line 3—3, Fig. 2. Fig. 4 is a transverse sectional view on line 4—4, Fig. 2. Fig. 5 is a partial side view in detail showing provisions hereinafter particularly referred to. Fig. 6 is a side elevation representing the general aspect of the top in its folded-up condition. Fig. 7 being a sectional view showing the structural character and nested arrangement of the bows and certain bars pivotally connected therewith when the top is in folded condition and substantially as seen on line 7—7, Fig. 6. Fig. 8 represents jointed parts comprised in the foldable top including a portion of one of the auxiliary bows and which will be hereinafter more particularly referred to. Fig. 9 is a partial elevation of the wind shield frame and wind shield thereon showing the relation thereto and connection therewith of the horizontal front or vizor bow comprised in the foldable top. Fig. 10 is a sectional elevation showing all of the members comprised in the foldable top as in their relations when folded nearly to compact condition.

Similar characters of reference indicate corresponding parts in all of the views.

Referring to the drawings, Figs. 1 and 2, A represents the body of an automobile having the openings B' and C' for the fore door B and the rear door C, the upper edges of which doors and the sides of the body being horizontal so that when the doors are closed their upper edges form a continuation with the adjacent upper edges of the body.

Comprised in the foldable top are (here described with reference to the parts in their set-up condition) a rear vertical bow D, a forward vertical bow E and a forward horizontal or vizor bow F. The rear vertical bow has at each side of the machine, the depending member thereof connected by pivot $a$ with the upper end of a link G which link by pivot $a^2$ has connection with the side of the body near the rear thereof and considerably below its upper edge.

The link G, as indicated in Figs. 1 and 2, is disposed in an oblique position, that is with an upward and rearward inclination; and H represents another link which has by pivots $b$ and $b^2$, connections with the vertical bow D at a point somewhat above the pivot $a$ and with the body comparatively near its back.

In the action of the folding of the top, in which the various bows, bars, braces and members jointed one with another are brought to compact relations and all swung downwardly and rearwardly, more or less as usual with folding tops, the rear vertical bow D, swinging on the pivot $a$ at the upper end of the link G is constrained by the link H to be crowded forwardly, such link swinging from the upward and rearward inclination shown in Fig. 2 to the upward and forward inclination shown in Figs. 6 and 10. This forward displacement of the folded top automatically accomplished simultaneously with the downward and rearward swinging of the top saves a manual operation on the part of the person effecting the desired dispositions.

At intermediate points in the height of the rearward and forward vertical bows considerably above the upper line of the body and doors, and about at the level at which the flexible material $c$ which forms the covering for the top is brought down to, at each side, bars $d$ $d$ are connected by pivots $e$ $e$ to the bows, said bars being by the joint $e^2$ hinge connected together on approximately the line of their upper sides and slightly above the level of the aforesaid pivots $e$ $e$. Both said members $d$ $d$ are formed as angle irons or angle bars having the members 15 thereof horizontally disposed and the members 16 thereof which are right angular thereto vertically disposed, the vertically disposed members 16 forming stops for the upper edge portions of the window sashes J and K which entirely fill the space upwardly and downwardly margined by the hinged and pivotally connected bars $d$ $d$ and the longitudinally continuous upper edge of the body and adjacent door C.

The vertical bows D and E are formed of metallic T-bars, the flange portions 17, 17, of which are in planes which are vertical, and longitudinally of the body, and such flange portions form members with which the forward vertical edge of the window section K and the rear vertical edge of the window section J have overlapping relations.

The horizontal upper edge of the body A has an upstanding rib $f$, or equivalent formation for a water bar, and the window section $j$ has a groove $f^2$ in its lower edge for an engagement with the rib and to form, when the window is in place, a dust, moisture and water check.

The rearward one of the horizontal bars $d$ has secured and also downwardly curved relatively to the upper horizontal portion 15 thereof, springs $g$ of flat strip metal; and outside of and opposite the depending portion 16 of the bar are members 17' depending from the bar portion 15 and which serve both as means for retaining the window section J against outward displacement when the latter is used and also to conceal the springs $g$.

The window section K is by the hinges $K^3$ jointed to the upper edge portion of the door in a manner to be swung downwardly and inwardly for a disposition closely against the inner side of the door. When the window section K is in its lowered position it is adapted to be shielded from injury by covering the same with a guard member X. This member is hingedly connected at its lower end as at X' to the inside of the door frame and is provided at its opposite end with a fastening bar as indicated at $X^2$, this latter bar is adapted to coact with a second bar arranged on the inner side of the upper horizontal bar of the door frame and thereby keeps the guard securely fastened in its closed position.

For bringing the window sections J and K into use in the situation described and shown in Fig. 2, the window section J (while the window section K is downwardly folded on the inner side of the door) is brought to a position above the door and slid, by its upper edge, between bar members 16 and the depending flanges 17', and by its lower grooved edge matched with the rib $f^2$ on the upper edge of the body until it rearwardly comes to an overlapping relation to the flange-like member 17 of the rear bow.

The window section J has at its forward vertical edge and at the inner side a flange-like strip 18 which projects sufficiently forwardly, as shown in Figs. 2 and 3, so that when the window section K, hinged to the door C, is swung to its upright position it is brought into a marginally overlapped relation to said window-carried flange-like member 18, and member 17, of the forward bow as well as against the stop formed by the depending member 16 of the hinge jointed and pivotally connected forward bar $d$.

In order that the rearward bow may be nicely positioned at the proper distance rearwardly beyond the edge of the door-carried window section K, so that such window sections together will fit with proper closeness in the casement therefor, the body has just behind the rear bow D an adjustable abutment which is constituted by a threaded stud 19 screw engaged through a lug 20 therefor. This screw stud when properly positioned forms a steadying abutment for the link and bow pivotally connected thereto and prevents any tendency of the parts to become relatively loose and rattle.

The forward horizontal or vizor bow F is arranged preferably at the same height as the hinge-connected bars $d$ $d$ and this bow comprises the two members $d^2$, $d^2$, longitudinally alined with the aforementioned bars $d$ $d$, and these are also jointed together by the hinge $e^3$,—the rearward one $d^2$ being pivotally connected at or adjacent the point $e$ to the forward bow E, while the forward member $d^2$ has connection with the post-like part L comprised, at each side of the machine, in the wind shield support or frame, this connection with such frame being a detachable one and effected through means of the screw $h$ having, as here represented, a butterfly nut for convenience of turning it.

M represents an auxiliary bow about midway between the bows E and D for preventing bagging or sagging of the flexible portion of the top at this place, the depending portions of the same extending less far down than the hinge jointed bars $d$ $d$.

To the depending portion at each side of this auxiliary bow, links $k$ $k$ are secured by a common pivot $k^2$, they thence extending obliquely, downwardly, forwardly and rearwardly and by pivots $k^3$, $k^3$, have connections with the bars $d$ $d$ at points forward and to the rear of the hinge $e^2$.

An extension $M^2$ of the auxiliary bow M, which is preferably formed of a spring metal strip, by an aperture $M^3$ in its lower portion, has engagement with the hinge pivot extension $e^4$ as represented in Fig. 8, whereby a sufficiently rigidly braced, or a trussed character, is imparted to the connections between the auxiliary bow M and the hinge connected bars $d$ $d$, so that accidental collapse of the jointed parts is impossible.

The bars $d^2$, $d^2$, comprised in the forward horizontal or vizor bow F hinge jointed together at $e^3$ as before stated are in substance counterparts of the aforementioned hinge jointed and pivotally connected bars $d$ $d$ between the vertical bows D and E, the same having the horizontal portions 15, and the depending portions 16 to constitute window stops, and a sash window section $J^2$ is supplied to be removably engaged between the upper horizontal edge of the body A and the rearward one of the bars $d^2$, the depending member 16 of the bar $d^2$ serving as window stops for such sash, said window sash having at its lower edge a rib and groove engagement where it joins the upper edge of the body and having at its upper edge an engagement between the depending flange-like members 16, 17′ and subjected to the compression of the spring $g$; and this window section likewise carries at its forward edge portion a metallic strip 18′, whereby to acquire an overlapping relation to the marginal, vertical, portion of the sash $K^2$ which is hinge-connected to and inwardly foldable relatively to the fore door in the same manner as has been hereinabove described in conjunction with the window section K hinge connected to the rear door C. And thus in the space above the fore door and the portion of the body between such door and the rear door and the longitudinally ranging bar-like member $d^2$, $d^2$, of the vizor bow, and which space is bordered by the forward bow E and the upright post-like part of the wind shield frame L, the glass sashes $J^2$ and $K^2$ are provided for closure, as occasion may require in substantially the same manner as provided for the similar space to the rearward thereof.

The forward portion of the flexible material $e$ comprised in the top which has an obtuse angular line between its forward end and its junction with the forward bow E is supported by the auxiliary bow O, the opposite downturned members of which are intermediately connected by pivot $m$ to a link $n$ which by pivot $o$ has connection with the forward bow E somewhat above the line of the hinge jointed bars $d$ and $d^2$, such link $n$ also being pivotally connected to the forward one of the bar members $d^2$ somewhat in advance of the hinge joint $e^3$.

P represents an auxiliary bow for supporting in proper contour the back upper portion of the top, the same being employed in this situation in a manner substantially the same as more or less common in foldable tops.

It having been rendered manifest in what manner the two sets of window sections at each side of the machine may be either or all thereof set up for the partial or entire closure of the space within the body, it will now be briefly explained that when desired to render the car entirely open it is only necessary to detach the fastenings $h$ for the front vizor bow,—where the latter is connected with the upper part of the wind shield frame,—and also the fastening at the lower end of each depending member of the foldable bow E, whereupon all of the auxiliary bows and hinge jointed window stop-forming bars pivotally connected to the main bows, and the auxiliary bows may be folded to compact relations, the approached conditions of which are represented in Fig. 10 in which the bar members $d^2$, $d^2$, are folded one over the other, the auxiliary bow O as constrained by the sidewise located link $n$ acquiring a disposition closely next to the forward bow E, and the hinge connected bar-like members $d$ $d$ being doubled on themselves permit the bows E and D to be brought closely together in the nested relations represented in Fig. 7, the auxiliary bow M coming in between such bows E and D, it being understood that the bar-like members $d$ $d$ and $d^2$, $d^2$, and the various links included in the jointed skeleton-like frame of the top, having their locations in longitudinally ranging vertical planes at each side of the body, constitute no obstructions to the folding and unfolding actions.

I am aware that an automobile body has been made or proposed which has been constructed with a top of foldable character and in which a sash window has been carried, in a manner, by the door; and adapted, when desired to close the opening directly above the door, to be moved in such closed position; but in such construction the window was slidable relatively to an additionally provided internally grooved frame hinged to the upper portion of the door and serving as a casing for the window sash only when the same is raised, the said sash being adapted, when lowered, to descend into a pocket within the door; and in said construction, requiring a comparatively thick and bulky frame, for the window sash, hinged to the upper portion of the door, it is necessary that the window sash be capable of transverse movement relatively to the frame so that such sash when lifted out of the pocket therefor in the door will be brought to a position of rest upon the upper edge of the door adjacent the mouth of the pocket.

Now, it is to be especially pointed out that in the construction and arrangement here provided by me, no window frame or casement for the glass-sash, hinge-connected to the door, and provided additional to the sash, is required, the sash being directly hinge-connected to the door and when swung up to firm and anti-rattling contact against the stop thereabove, filling that portion of the space above the door while a portion of the space to one side of, or longitudinally beyond each door is substantially entirely closed by the removable glass sash,—the one glass sash having a portion for matching with and in overlapping relation to the adjacent vertical edge of the other sash, and without the requirement that any fixed or dividing member be provided as an appurtenance of either the body or the top.

I claim:—

1. The combination with a vehicle body, of a foldable top including a rear bow and another bow for detachable connection with the body forwardly of the rear bow, and pivotally jointed means connecting the bows, a link pivotally mounted on the side of the body below the upper edge thereof, and extending in a general upward direction from its pivot, and to the upper end of which link the lower end of the rear bow is pivoted, and means for automatically forcing the bows and the link to which the rear bow is connected forwardly as the bows are downwardly and rearwardly swung.

2. The combination with a vehicle body of a foldable top comprising a bow, a link pivotally mounted on the side of the body below the upper edge thereof and extending from its pivot upwardly and with a rearward inclination, and to the upper end of which link the lower end of the bow is pivoted, and a link pivoted to an upper part of the body to the rear of the bow, upwardly and forwardly inclined and pivoted to the bow above the pivotal connection of the latter with the first named link and operative to automatically force the bow and the link to which it is connected, forwardly as such bow is downwardly and rearwardly swung.

3. In a vehicle body, the combination of a body proper, a foldable top, a door in the body having a foldable glass sash hinged thereto, a normally horizontal member above the door forming a stop for the foldable sash when the latter is in its raised position.

4. The combination of a vehicle body having a side door, a top with horizontal members above the door and the portion of the body-side adjacent thereto, a glass sash fitting between the upper edge portion of the body to one side of the door and said horizontal member, and a foldable door sash which can be raised to position adjacent to the removable window sash, and means for holding the removable window sash in its place.

5. The combination with a vehicle body having in its side a door opening and a door for closing the same, of a foldable top including relatively rear and forward bows, the depending member of the forward one of which is detachably connected to the side of the body forward of the door opening, supporting means movable forwardly and rearwardly relatively to the body, and to which the rearward one of said bows has a pivotal connection, and adapted to be swung rearwardly and downwardly, normally horizontal bars hinge connected one to another between said depending bow members and also pivoted to such members intermediately of the height thereof, removable glass sashes for closing the open space of which the upper edges of the body and door, the depending bow members and the hinge connected horizontal bars form the boundaries, and means for causing a forward movement of said supporting means, and the rear bow connected therewith, forwardly as the foldable top is downwardly and rearwardly swung.

6. The combination with a vehicle body having in its side a door opening and a door for closing the same, of a foldable top including relatively rear and forward bows, the depending member of the forward one of which is detachably connected to the side of the body forward of the door opening, the rear bow is jointed to the body to the rearward of such opening, and adapted to be swung rearwardly and downwardly, normally horizontal bars hinge connected one to another between said depending bow members and also pivoted to such members intermediately of the height thereof, a window sash hinge-connected to the upper part of the door and adapted to close the space between the door and one of said hinge connected horizontal bars.

7. The combination with a vehicle body having in its side a door opening and a door for closing the same, of a top including relatively rear and forward bows, the depending member of the forward one of which is connected to the side of the body forward of the door opening while the rear bow is jointed to the body to the rearward of such opening, a horizontal bar connected to said depending bow members intermediately of the height thereof, a window sash hinge-connected to the upper part of the door and adapted to close the space above the door and between it and one of said hinge connected horizontal bars and another window sash adapted to close the space between the rear bow and window section carried by the door,—the parts which form the boundaries of the space for the reception of said window sections including stops for receiving bearings thereagainst of said window sashes.

8. The combination with a vehicle body having in its side a door opening and a door for closing the same, of a top including relatively rear and forward bows, the depending member of the forward one of which is detachably connected to the side of the body forward of the door opening while the rear bow is jointed to the body to the rearward of such opening, and adapted to be swung rearwardly and downwardly, normally horizontal bars hinge-connected one to another between said depending bow members and also pivoted to such members intermediately of the height thereof, a window sash hinge-connected to the upper part of the door and adapted to close the space above the door and between it and one of said hinge connected horizontal bars and another window sash adapted to close the space between the rear bow and window sash carried by the door, one of said sashes having along one of its vertical edges a member adapted to have an overlapping relation to the margin of the adjacent window sash.

9. The combination with a vehicle body having at its side a door opening, with a door for closing the same, and having a rib along its upper edge constituting a water bar, of a top including relatively rear and forward bows, the depending member of the forward one of which is connected with the side of the body forward of the door opening, while the rear bow is connected to the body considerably to the rear of such opening, a horizontal angle bar connected to said bow members intermediately of the height thereof, and a window sash having a groove at its bottom for engagement with said water bar and adapted to have its top in engagement with the horizontal bar.

10. The combination with a vehicle body having at its side a door opening with a door for closing the same, of a foldable top including relatively rear and forward bows, the depending member of the forward one of which is detachably connected with the side of the body forward of the door opening, while the rear bow is jointed to the body considerably to the rear of such opening and adapted to be swung rearwardly and downwardly, and normally horizontal bars hinge connected one to another between said depending bow members and pivoted to such members intermediately of the height thereof, one of said bars comprising a horizontal member, and a vertical window stop forming flange, and a spring carried by and downwardly reacting below the horizontal portion of said bar.

11. The combination with a vehicle body having at its side a door opening, with a door for closing the same, and having a rib along its upper edge, of a top including relatively rear and forward bows, the depending member of the forward one of which is connected with the side of the body forward of the door opening, while the rear bow is connected to the body considerably to the rear of such opening, a horizontal bar extending between and connected to said depending bow members intermediately of the height thereof, and made with a window stop, a window sash provided with a groove at its bottom to engage said rib and adapted to have its upper edge engage against said stop along the rear portion of said horizontal bar, and a spring for exerting a vertical downward pressure against the window section.

12. The combination with a vehicle body having at its side a door opening with a door for closing the same, and having along its upper edge an upstanding rib, of a top including relatively rear and forward bows, the depending member of the forward one of which is connected with the side of the body forward of the door opening, while the rear bow is connected to the body considerably to the rear of such opening and adapted to be swung rearwardly and downwardly, normally horizontal bars hinge-connected one to another between said depending bow members and pivoted to such members intermediately of the height thereof, the rearward one of said bars being made with a portion to form a window stop, and said bar having a depending member opposite to, and ranging parallel with, its window stop forming portion, a window sash having a groove in its bottom to engage said rib and adapted to have its upper portion in engagement against said stop and disposed between the stop and said depending member, and a spring for exerting a vertical pressure against the window section.

13. The combination with a vehicle body having a door opening in its side and a door for closing the same, of a top including a bow, the depending member of which is located in line with the forward boundary of said door opening and another bow the depending member of which is located at a considerable distance to the rear of such opening, a bar horizontally arranged between and connecting the said bow depending members intermediate of the height of such bows, and comprising a horizontal member and a depending flange-like window stop, such bar at its portion which is to the rearward of the door opening having a depending member opposite to and ranging parallel with the window stop and also having a downwardly reacting spring, a window section having at its bottom rib and groove engagement with the upper edge portion of the body which is to the rear of the door opening and adapted for engagement between the window stop of said bar and the depending member opposite thereto and to be downwardly pressed by said spring and another window section hinge connected to the upper portion of the door and when swung upwardly to engage against the window stop of the said horizontal bar.

14. The combination with a vehicle body of a foldable top comprising a bow, a link pivotally mounted on the side of the body below the upper edge thereof and extending in a generally upward direction from its pivot, and to the upper end of which link the lower end of the bow is pivoted, an abutment for limiting the rear swinging movement of the pivotally connected link and bow, and means for automatically forcing the bow and link forwardly when the bow is downwardly and rearwardly swung.

15. The combination with a vehicle body having in its side a door opening and a door for closing the same, of a top, including a normally vertical bow and a vertical member supported by the body forward of such bow, a bar connected with the vertical bow and said upright member forward thereof, a window sash adapted to engage between the upper portion of the body and the bar thereabove, and a window sash hinge connected to said door and adapted to be swung up between the upper edge of the door and the forward portion of the bar, and said sash windows together entirely closing the space between said vertical bow and said vertical member forward thereof.

16. A vehicle top comprising normally vertical bows composed of metallic angle strips having the angular portions thereof in longitudinal and transverse planes, and bars also composed of metallic angle strips having the angular portions thereof in similar planes, and having ends of the portions in longitudinal planes hinge jointed one to another and having their outer ends engaged alongside of and pivotally connected to the portions of said bows which are in the longitudinal planes whereby in the folding of the parts said bars may have closely nested relations to each other and to the bows.

17. The combination with a vehicle body having in its side a door opening and a door for closing same, of a post-like upright forward of the door opening, and another post-like upright at a considerable distance to the rear of said door opening, normally horizontal bars hinge connected one to another and also jointed in said uprights, a window sash for a closure of the space forward of the rearwardly located upright and between the body and one of said hinge jointed bars, and another window sash hinge connected to the upper part of the door, adapted to close the space above such door, and forwardly between the first named window section and the forwardly located upright.

18. The combination with a vehicle body of a top including a rear bow and a bow forward thereof the depending members of which are connected to the sides of the body, normally horizontal bars hinge connected together and pivoted to said bow members, an auxiliary bow member between said first named bows, links connected to the depending portions of said auxiliary bow and to the said bars at points respectively forward and to the rear of their hinge connections, and detachable means for preventing a collapse of the pivotally jointed bars and link-connected auxiliary bow.

19. The combination with a vehicle body of a foldable top including a rear bow and a bow forward thereof the depending members of which are connected to the sides of the body, normally horizontal bars pivoted to said bow members, and having hinges connecting them, each formed with an extended pivot, an auxiliary bow between said first named bows, links connected to the depending portions of said auxiliary bow and to the said bars at points respectively forward and to the rear of their hinge connections and apertured spring plates carried by the depending portions of the auxiliary bow, and adapted to detachably engage the extended hinge pivots.

20. In a vehicle body, the combination with a body proper, a foldable top, a door in the body, a removable sash, means for mounting said sash between the upper edge of the body and the foldable top on one side of the door, and a swinging sash secured to the top edge of the door and cooperating with the first named means for preventing removal of the sash when the swinging sash is in operative position.

21. In a vehicle body, the combination of a body proper, a foldable top, a door in the body, a removable sash, means for mounting said sash between the upper edge of the body and the foldable top on one side of the door, and a sash section secured to the door and adapted when raised into operative position to coöperate with the first named means for holding the removable sash in position.

22. The combination of a vehicle body having a side door, a top with horizontal members above the door and the portion of the body side adjacent thereto, a glass sash slidably mounted between the upper edge portion of the body to one side of the door and said horizontal member, and a pivoted door sash which can be raised into position adjacent to the slidable sash thereby constituting a means for preventing the removal of the slidable sash when the swinging sash is in its operative position.

Signed by me at Springfield, Mass., in presence of two subscribing witnesses.

HINSDALE SMITH.

Witnesses:
G. R. DRISCOLL,
WM. S. BELLOWS.